United States Patent
Tanaka et al.

(10) Patent No.: US 11,765,303 B2
(45) Date of Patent: Sep. 19, 2023

(54) IMAGE FORMING APPARATUS COMPRISING AN INNER DISCHARGE SPACE AND A LIGHT EMITTING SECTION LOCATED AT THE BORDER BETWEEN THE INNER SPACE AND THE LOWER PART OF THE HOUSING

(71) Applicant: Seiko Epson Corporation, Tokyo (JP)

(72) Inventors: Yoshiyuki Tanaka, Matsumoto (JP); Tomoyuki Higuchi, Shiojiri (JP); Kenji Yanagisawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/648,775

(22) Filed: Jan. 24, 2022

(65) Prior Publication Data
US 2022/0239802 A1 Jul. 28, 2022

(30) Foreign Application Priority Data

Jan. 25, 2021 (JP) ................. 2021-009355

(51) Int. Cl.
*H04N 1/23* (2006.01)
*H04N 1/00* (2006.01)
*H04N 1/48* (2006.01)

(52) U.S. Cl.
CPC ........... *H04N 1/484* (2013.01); *H04N 1/0053* (2013.01); *H04N 1/2392* (2013.01); *H04N 2201/0094* (2013.01)

(58) Field of Classification Search
CPC .... H04N 1/0053; H04N 1/2392; H04N 1/484; H04N 2201/0094

(Continued)

(56) References Cited

U.S. PATENT DOCUMENTS

| 6,741,818 B1* | 5/2004 | Penke ................ G03G 15/5016 399/81 |
| 2004/0184022 A1* | 9/2004 | Kamiyama .............. B65H 1/04 355/75 |

(Continued)

FOREIGN PATENT DOCUMENTS

| JP | H08-339107 | 12/1996 | |
| JP | 2008048011 A | * 2/2008 | ........... G03B 21/134 |
| JP | 2008268785 A | * 11/2008 | |

OTHER PUBLICATIONS

Review of HP M234dwe printer in Nov. 22, 2020 on Youtube. "https://www.youtube.com/watch?v=vyFKkq-sr7Y".*

(Continued)

*Primary Examiner* — Chad Dickerson
(74) *Attorney, Agent, or Firm* — WORKMAN NYDEGGER (57) ABSTRACT

An internal discharge space is defined between an image reading section and an image forming section and the internal discharge space has an opening in a front of the image forming apparatus. Since the internal discharge space has the opening in the front of the image forming apparatus, a border between the internal discharge space and the housing is located in the front of the image forming apparatus. A light emitting section having a predetermined length along the border is provided and emits light along the predetermined length of the border, enabling users to check a light emission state from a distance. Accordingly, a state of the image forming apparatus can be indicated by the light emitting section.

8 Claims, 9 Drawing Sheets

(58) Field of Classification Search
USPC .......................................................... 358/509
See application file for complete search history.

(56) References Cited

U.S. PATENT DOCUMENTS

| | | | |
|---|---|---|---|
| 2008/0175640 A1* | 7/2008 | Akiyama | G03G 15/6552 |
| | | | 399/405 |
| 2009/0213436 A1* | 8/2009 | Takuwa | H04N 1/00384 |
| | | | 358/442 |
| 2018/0157202 A1* | 6/2018 | Watanabe | G03F 1/84 |
| 2019/0052759 A1* | 2/2019 | Ohata | G03G 15/5012 |
| 2020/0124916 A1* | 4/2020 | Nakamura | G02F 1/133603 |
| 2020/0204687 A1* | 6/2020 | Brown | H04N 1/00129 |
| 2021/0168259 A1* | 6/2021 | Mitamura | H04N 1/02825 |

OTHER PUBLICATIONS

Savin (Ricoh) printer MP 4055 product introduction. Pub Date: Feb. 16, 2017. "https://www.prnewswire.com/news-releases/new-ricoh-mfp-series-offers-advanced-applications-and-features-at-an-affordable-price-point-300408727.html".*

* cited by examiner

FIG. 10

IMAGE FORMING APPARATUS COMPRISING AN INNER DISCHARGE SPACE AND A LIGHT EMITTING SECTION LOCATED AT THE BORDER BETWEEN THE INNER SPACE AND THE LOWER PART OF THE HOUSING

The present application is based on, and claims priority from JP Application Serial Number 2021-009355, filed Jan. 25, 2021, the disclosure of which is hereby incorporated by reference herein in its entirety.

BACKGROUND

1. Technical Field

The present disclosure relates to an image forming apparatus.

2. Related Art

A housing of an image forming apparatus disclosed in JP-A-8-339107 has a concave discharge section 4 that is surrounded by the housing except for the front. The image forming apparatus also includes an illumination lamp 46 on the upper rear of the discharge section 4. The illumination lamp 46 is automatically switched on when a paper sheet is discharged onto a discharge tray 41 and is switched off when a predetermined time period has elapsed.

Such a known image forming apparatus illuminates the print product discharged onto the concave section in the housing to enable the user to locate the print product more readily in the concave section, which tends to be dark, but the apparatus fails to provide any further information when the concave section is viewed from a distance. The present disclosure enables users to readily check the state of an image forming apparatus from a distance.

SUMMARY

According to an aspect of the present disclosure, an image forming apparatus includes a housing, an image reading section configured to read a document mounted on a document placing table, an image forming section configured to form an image read by the image reading section or form another image on a sheet, a discharge section configured to discharge the sheet on which the image is formed by the image forming section, and a discharge tray configured to receive the sheet discharged from the discharge section. In the image forming apparatus, an internal discharge space is defined between the image reading section and the image forming section, the internal discharge space has an opening in a front of the image forming apparatus, and a light emitting section having a predetermined length along a border between the internal discharge space and the housing is provided.

The image forming apparatus according to the aspect of the present disclosure includes a housing, an image reading section configured to read a document mounted on a document placing table, an image forming section configured to form an image read by the image reading section or form another image on a sheet, a discharge section configured to discharge the sheet on which the image is formed by the image forming section, and a discharge tray configured to receive the sheet discharged from the discharge section. When the image reading section reads a document mounted on the document placing table or an image is externally supplied, the image forming section forms the image read by the image reading section or the other image on a sheet, and the discharge section discharges the sheet on which the image is formed by the image forming section onto the discharge tray.

An internal discharge space is defined between the image reading section and the image forming section and the internal discharge space has an opening in a front of the image forming apparatus. Since the internal discharge space has the opening in the front of the image forming apparatus, the border between the internal discharge space and the housing is located in the front of the image forming apparatus. A light emitting section having a predetermined length along the border is provided and emits light along the predetermined length of the border.

The image forming apparatus according to the aspect of the present disclosure emits light along the predetermined length of the border with the internal discharge space in the front of the image forming apparatus, enabling the user to visually check the light emission state from a distance. Accordingly, a state of the image forming apparatus can be indicated by the light emitting section.

DESCRIPTION OF EXEMPLARY EMBODIMENTS

Figure 1:
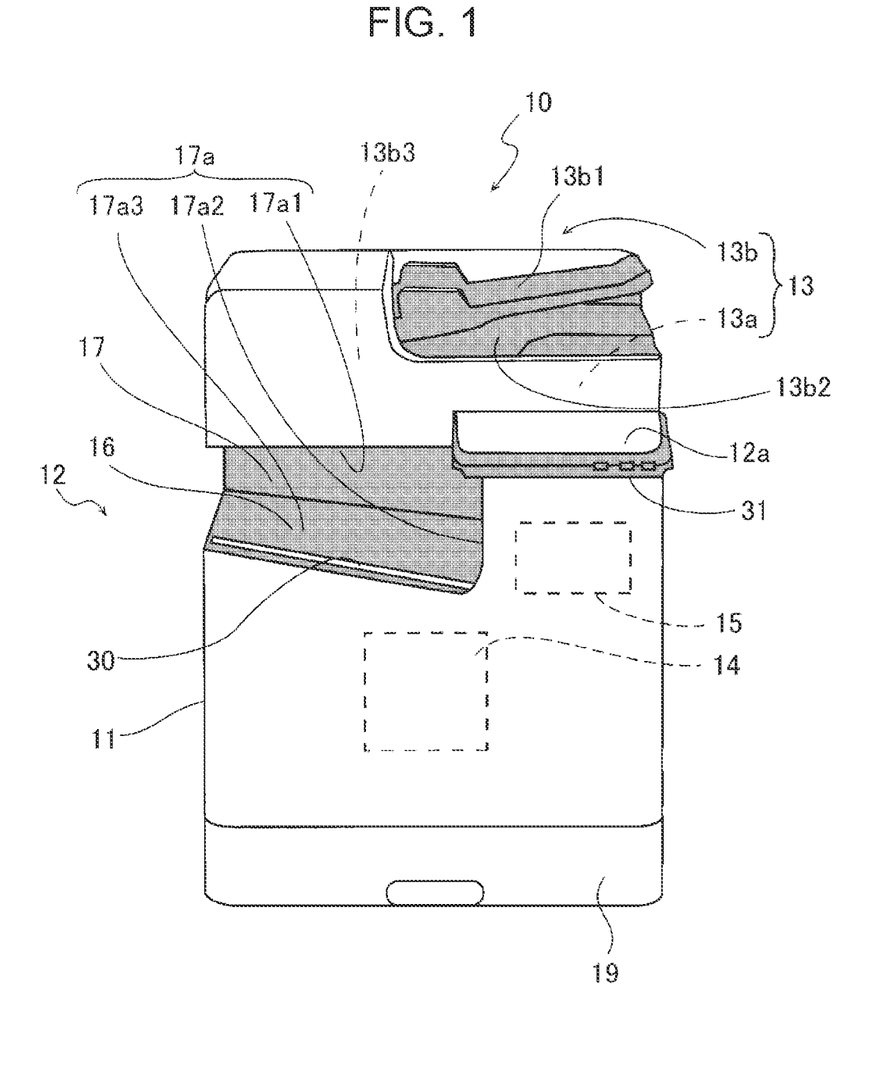
FIG. 1 is an external perspective view illustrating an image forming apparatus.

Hereinafter, an embodiment of the present disclosure will be described with reference to the attached drawings. FIG. 1 is an external perspective view illustrating an image forming apparatus. In FIG. 1, an image forming apparatus 10 includes a body 12 that has a housing 11 which has a substantially prism shape and which is substantially rectangular in plan view. The body 12 includes an image reading section 13, an image forming section 14, a discharge section 15, and a discharge tray 16. The image reading section 13 is disposed on the housing 11 and reads a document mounted on a document placing table 13a. The image forming section 14 is disposed below the image reading section 13 and forms an image read by the image reading section 13 on a predetermined sheet. The discharge section 15 discharges the sheet on which the image is formed by the image forming section 14. The discharge tray 16 receives the sheet discharged from the discharge section 15. In this embodiment, an auto document feeder (ADF) 13*b* is provided as a part of the image reading section 13. The ADF 13*b* is disposed on the document placing table 13*a*.

The ADF 13*b* includes a document feeding table 13*b*1 that is inclined gently upward from a central portion to the right. The ADF 13*b* includes a mechanism section 13*b*3 on the left. The mechanism section 13*b*3 feeds a document on the document feeding table 13*b*1 downward, reverses the document by 180 degrees, transports the document that has passed a left upper surface of the document placing table 13*a*, and discharges the document onto a document discharge tray 13*b*2 disposed below the document feeding table 13*b*1. The ADF 13*b* including the mechanism section 13*b*3 is bright white overall, whereas the document feeding table 13*b*1 and the document discharge tray 13*b*2 are dark gray. Documents are generally white paper and can be readily distinguished on the document feeding table 13*b*1 and document discharge tray 13*b*2 which have a dark color.

The housing 11 of the body 12 has an internal discharge space 17 that is defined below the image reading section 13, and the front and the left side of the internal discharge space 17 are open. Accordingly, except for the internal discharge space 17, the housing 11 of the body 12 extends continuously in an up-down direction on the rear and on the right of the internal discharge space 17. The housing 11 is bright white overall, and a wall surface 17*a* of the internal discharge space 17 is dark gray overall.

The body 12 accommodates the image forming section 14 below the internal discharge space 17, and thus the internal discharge space 17 is defined between the image reading section 13 and the image forming section 14 in the body 12. As described above, the body 12 has the internal discharge space 17 defined between the image reading section 13 and the image forming section 14, and the body 12 may have a portion, in which the internal discharge space 17 is not provided, on the rear and on the right between the image reading section 13 and the image forming section 14.

Figure 2:
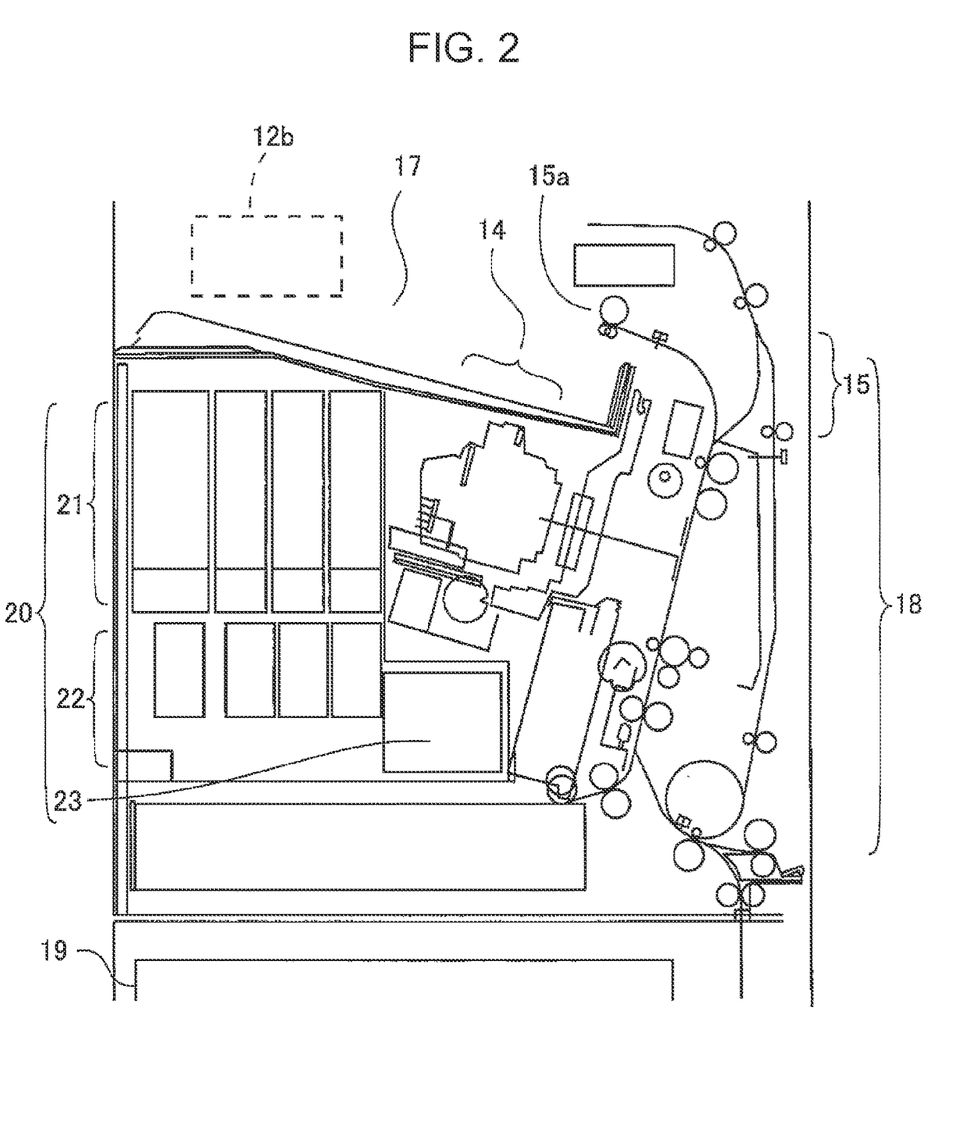
FIG. 2 is a schematic view illustrating main components of the image forming apparatus.

FIG. 2 is an external perspective view illustrating main components of the image forming apparatus. FIG. 2 illustrates a lower portion of the image forming apparatus below the internal discharge space 17, in which the bottom of the internal discharge space 17 serves as the discharge tray 16. The discharge tray 16 is an inclined surface that is inclined downward from the left to the right. As described above, the wall surface 17*a* of the internal discharge space 17 is dark gray overall, and an upper wall surface 17*a*1 (the top portion) of the wall surface 17*a* is horizontal, a right wall surface 17*a*2 is vertical, and a lower wall surface 17*a*3 (the bottom portion) is an inclined surface that is inclined downward from the left to the right. An operation panel (also referred to as an operation unit) 12*a* protrudes forward from the body 12 on the right of the internal discharge space 17. The rear of the operation panel 12*a* is bright white and the operation panel 12*a* includes a touch panel provided at almost the entire top, on which operations are performed, and a surrounding bezel portion is black.

The discharge section 15 has a discharge port 15*a* on the right of the internal discharge space 17. The discharge section 15 discharges a sheet, on which an image has been formed by the image forming section 14 disposed below the internal discharge space 17, onto the discharge tray 16 via the discharge port 15*a*. The discharge section 15 is a part of a transport unit 18 that includes a transport belt, rollers, and other components. The transport unit 18 transports paper sheets in a paper cassette 19 disposed in a lower portion of the body 12 to the image forming section 14 and discharges the paper sheets on which images are formed. As described above, the transport unit 18 feeds paper sheets from the paper cassette 19 disposed in the lower part, transports the paper sheets in the image forming section 14, and discharges the paper sheets in the discharge section 15. In this embodiment, the transport unit 18 performs all transport operations; however, a mechanism in which the transport operations are individually performed in respective steps may be provided.

The image forming apparatus 10 according to the embodiment transports paper sheets in the right portion of the body 12 and forms images on the paper sheets by using the ink jet image forming section 14 during transport of the paper sheet, and a space is defined on the left of the image forming section 14 below the internal discharge space 17. A consumable-item attachment section 20 of the image forming apparatus 10 is provided in this space. The consumable-item attachment section 20 accommodates an ink cartridge 21 in an upper portion, an ink supply unit 22 below the ink cartridge 21, and a waste liquid box 23 adjacent to the ink supply unit 22. A predetermined color ink contained in the ink cartridge 21 is supplied to a head of the image forming section 14 via the ink supply unit 22 and is used to form images. Waste liquid that is discharged during head cleaning performed at a predetermined timing is collected into the waste liquid box 23. The ink cartridge 21 and the ink supply unit 22 are collectively referred to as an ink supply section, and the waste liquid box 23 is also referred to as a waste liquid container. The housing 11 accommodates a controller 12*b*, which controls display of operations and operations input to the operation panel 12*a* and controls corresponding components in response to the operations.

In FIG. 1, the upper wall surface 17*a*1, the right wall surface 17*a*2, and the lower wall surface 17*a*3 of the internal discharge space 17 have respective borders with a front wall surface of the housing 11. The border between the right wall surface 17*a*2 and the front wall surface and the border between the lower wall surface 17*a*3 and the front wall surface of the housing 11 each have an arc. A light emitting section 30 is provided at a front end portion of the lower wall surface 17*a*3. More specifically, a light-emitting diode (LED) that emits white light is disposed straight in the lower wall surface 17*a*3, and the top of the LED is covered by a blue plate to enable diffusion of blue light. The light emitting section 30 is disposed substantially straight from a left end of the lower wall surface 17*a*3, which is inclined downward from the left to the right, to a right end, at which the arc starts. In other words, the light emitting section 30 extends straight substantially along the length of the front end of the lower wall surface 17*a*3. A method of switching on the light emitting section 30 to indicate a light emission state of the light emitting section 30 is appropriately controlled by the controller 12*b* depending on the state of the image forming apparatus 10.

As described above, the internal discharge space 17 has the opening in the front of the image forming apparatus 10 and has the light emitting section 30 having a predetermined length along the border between the internal discharge space 17 and the housing 11. The light emitting section 30 emits light along the predetermined length of the border with the internal discharge space 17 in the front of the image forming apparatus 10, and thus a portion of the outer surface is illuminated in the form of a line, enabling the user to readily visually check the light emission state from a distance. Accordingly, a state of the image forming apparatus 10 can be indicated by the light emitting section 30. When the light emitting section 30 is switched on, blue light is emitted and diffused. The blue light emitted at the border between the dark-color portion and the bright-color portion is clearly visible, resulting in increased visibility. Accordingly, the user can readily check the blue light from a distance.

Examples of indication of states of the image forming apparatus 10 include indicating sheet discharge after image formation, slowly blinking during a series of print jobs, continuously illuminating after print job completion, and rapidly repeatedly blinking when an error has occurred. These examples of indication are merely examples, and indication control by other methods may be made. The light emitting section 30 according to the embodiment extends at the border between the internal discharge space 17 and the housing 11. In addition, light emission may be performed in a lower portion of the operation panel 12a. In such a case, the operation panel 12a is a plate-shaped operation unit that protrudes forward from a front portion of the image reading section 13 of the housing 11 and includes a sub-light emitting section 31 that emits light in a lower portion of the operation panel 12a, in addition to the light emitting section 30. The sub-light emitting section 31 is disposed at a position readily viewable by the user, resulting in increased visibility. The image forming apparatus 10 according to the embodiment includes one paper cassette 19 in the lower portion, enabling the user to readily perform operations when the image forming apparatus 10 is placed, for example, on a table in an office. It should be noted that the structure according to the embodiment is not limited to this example.

Figure 3:
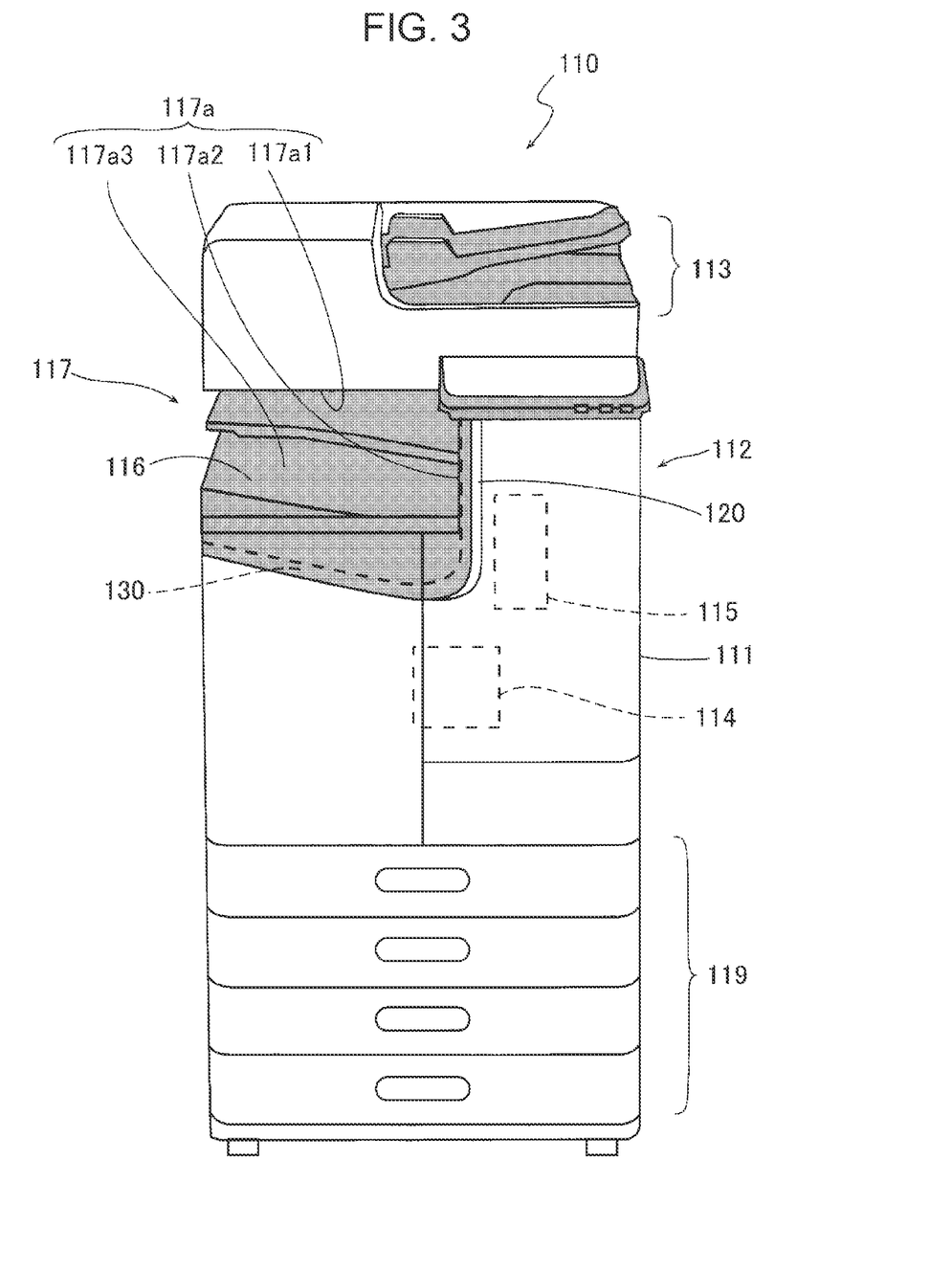
FIG. 3 is an external perspective view illustrating an image forming apparatus according to a modification.

FIG. 3 is an external perspective view illustrating an image forming apparatus according to a modification. An image forming apparatus 110 according to the modification includes a body 112 that has a substantially prism-shaped housing 111 that is taller than the image forming apparatus 10 according to the above-described embodiment. The image forming apparatus 110 includes an image reading section 113, an image forming section 114, a discharge section 115, and a discharge tray 116. The image reading section 113 is disposed in an upper portion of the image forming apparatus 110. The image forming section 114 is disposed below the image reading section 113 and forms an image read by the image reading section 113 on a predetermined sheet. The discharge section 115 discharges the sheet on which the image is formed by the image forming section 114. The discharge tray 116 receives the sheet discharged from the discharge section 115. The image forming apparatus 110 includes four paper cassettes 119 in a lower portion, and this structure having such a height enables the user to readily perform operations when the image forming apparatus 110 is placed, for example, on the floor in an office.

In this modification, the housing 111 of the body 112 has an internal discharge space 117 that is defined below the image reading section 113, and the front and the left side of the internal discharge space 117 are open. A wall surface 117a of the internal discharge space 117 is dark gray overall. The wall surface 117a of the internal discharge space 117 has a horizontal upper wall surface 117a1, a vertical right wall surface 117a2, and a lower wall surface 117a3 that is an inclined surface inclined downward from the left to the right.

The light emitting section 30 according to the above-described embodiment is provided at the front end portion of the lower wall surface 17a3, whereas a light emitting section 120 according to the modification is provided at a border between the vertical right wall surface 117a2 and a front wall surface of the housing 111. More specifically, the light emitting section 120 is disposed substantially straight from a top end of the vertical right wall surface 117a2 to a bottom end, at which an arc starts. In other words, the light emitting section 120 extends straight substantially along the length of the front end of the right wall surface 117a2. A light emission state of the light emitting section 120 is appropriately controlled by a controller (not illustrated) depending on the state of the image forming apparatus 110.

In the light emitting section 120, an LED that emits white light is disposed straight, and the top of the LED is covered by a blue plate to enable the diffusion of blue light. As described above, the internal discharge space 117 has the opening in the front of the image forming apparatus 110 and has the light emitting section 120 having a predetermined length along the border between the internal discharge space 117 and the housing 111. The light emitting section 120 emits light along the predetermined length of the border with the internal discharge space 117 in the front of the image forming apparatus 110, enabling the user to readily visually check the light emission state from a distance. Accordingly, a state of the image forming apparatus 110 can be indicated by the light emitting section 120. When the light emitting section 120 is switched on, blue light is emitted and diffused.

In this modification, the light emitting section 120 is elongated in the vertical direction and is less likely to be affected by obstacles when viewed from a distance. The light emitting section 120 according to the modification is provided at the front end portion of the right wall surface 117a2, whereas the light emitting section 30 according to the above-described embodiment is provided at the front end portion of the lower wall surface 17a3. In this modification, a light emitting section 130 may be provided at both front end portions of the right wall surface 117a2 and the lower wall surface 117a3. In such a case, the light emitting section 130 may be provided at an arc portion where the right wall surface 117a2 and the lower wall surface 117a3 are continuous. The elongated light emitting section 130 achieves increased visibility.

Figure 4:
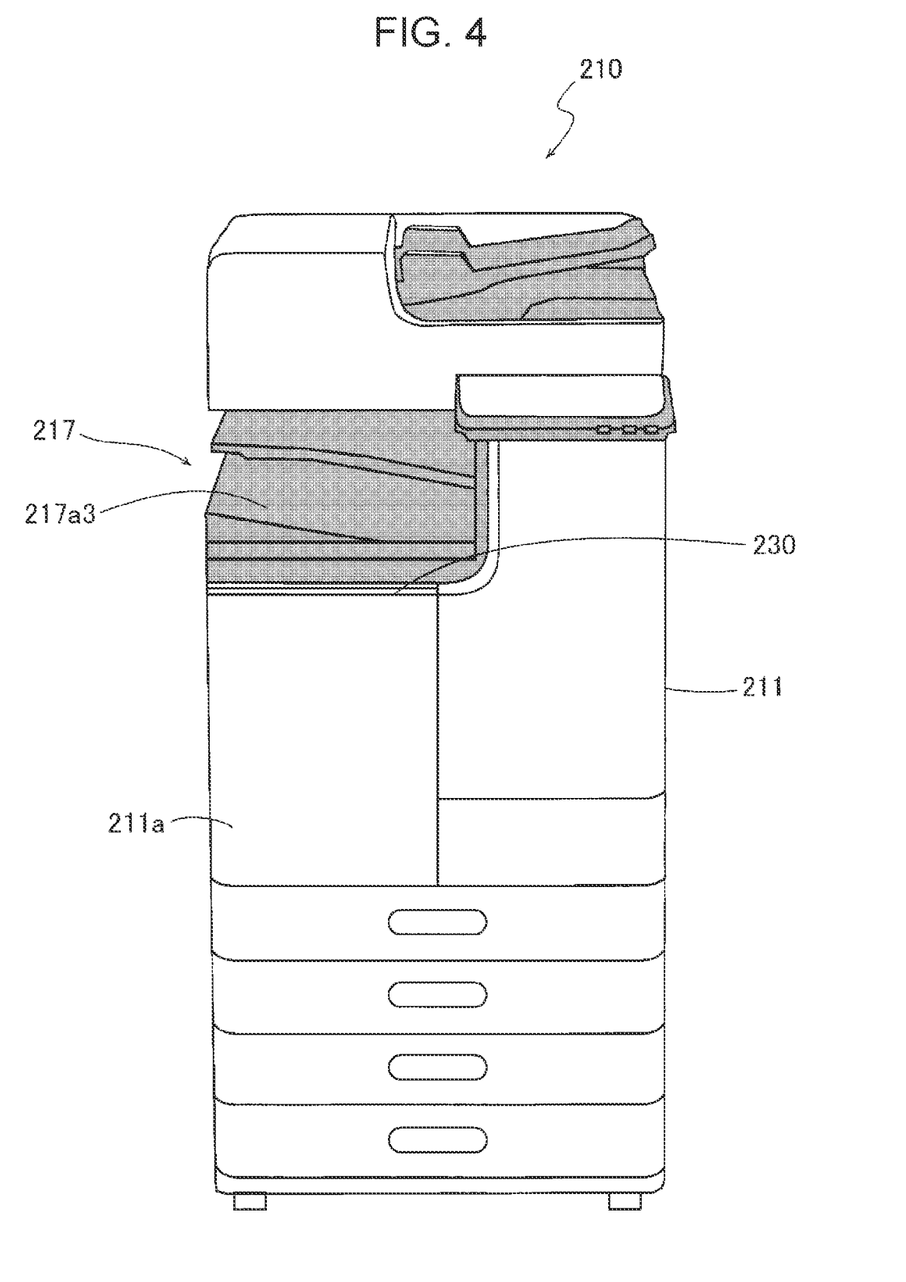
FIG. 4 is an external perspective view illustrating an image forming apparatus according to a modification.
Figure 5:
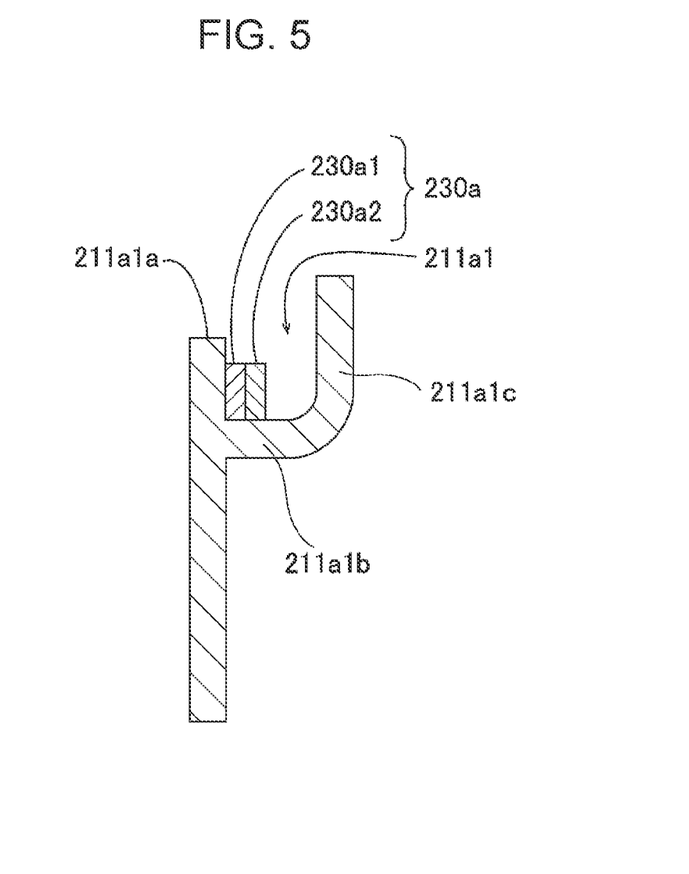
FIG. 5 is a partial sectional view illustrating the image forming apparatus.

The image forming apparatus 10 according to the above-described embodiment and the image forming apparatus 110 according to the above-described modification include the light emitting section 30 and the light emitting section 130, respectively, each having the LED, which emits white light and is disposed straight, and the top of the LED is covered by the blue plate to enable the diffusion of blue light. However, the structure of the light emitting sections is not limited to this example. FIG. 4 is an external perspective view illustrating an image forming apparatus according to a modification. FIG. 5 is a partial sectional view illustrating the image forming apparatus.

An image forming apparatus 210 according to the modification includes a door 211a that is openable toward the user and is disposed in a lower portion in the front of a housing 211. The door 211a is openable and closable about a rotation shaft at the right end and is rotatable toward the user at the left end. The door 211a has a substantially U-shaped recess 211a1 at a top end that is open at the top to enable the user to pull the door 211a to open or to close the door 211a as illustrated in FIG. 5. The recess 211a1 includes a front wall member 211a1a, a bottom wall member 211a1b, and a rear wall member 211a1c. The front wall member 211a1a is a front wall that constitutes the front of the housing 211. The bottom wall member 211a1b extends toward the rear from a position lower than a top end of the front wall member 211a1a to some extent. The rear wall member 211a1c is continuous with the bottom wall member 211a1b and extends upward from a position offset toward the rear of the image forming apparatus 210. The recess 211a1 is referred to as a step portion. In the step portion, the front wall member 211a1a is lower than the rear wall member 211a1c, which enables the user to place their fingertips into the step portion and hold and pull the top end of the front wall member 211a1a to open the door 211a.

A light emitting section 230 is provided on a rear wall surface of the front wall member 211a1a, which is a surface of the housing 211 opposite to the front. The light emitting section 230 includes a straight light emitter 230a in which the top of an LED 230a1 that emits white light is covered by a blue plate 230a2. The top end of the door 211a is adjacent to a bottom wall surface 217a3 of an internal discharge space 217 and extends straight in a substantially horizontal direction. With this structure, the light emitting section 230 has a predetermined length along the border between the internal discharge space 217 and the door 211a constituting the front of the housing 211.

Figure 6:
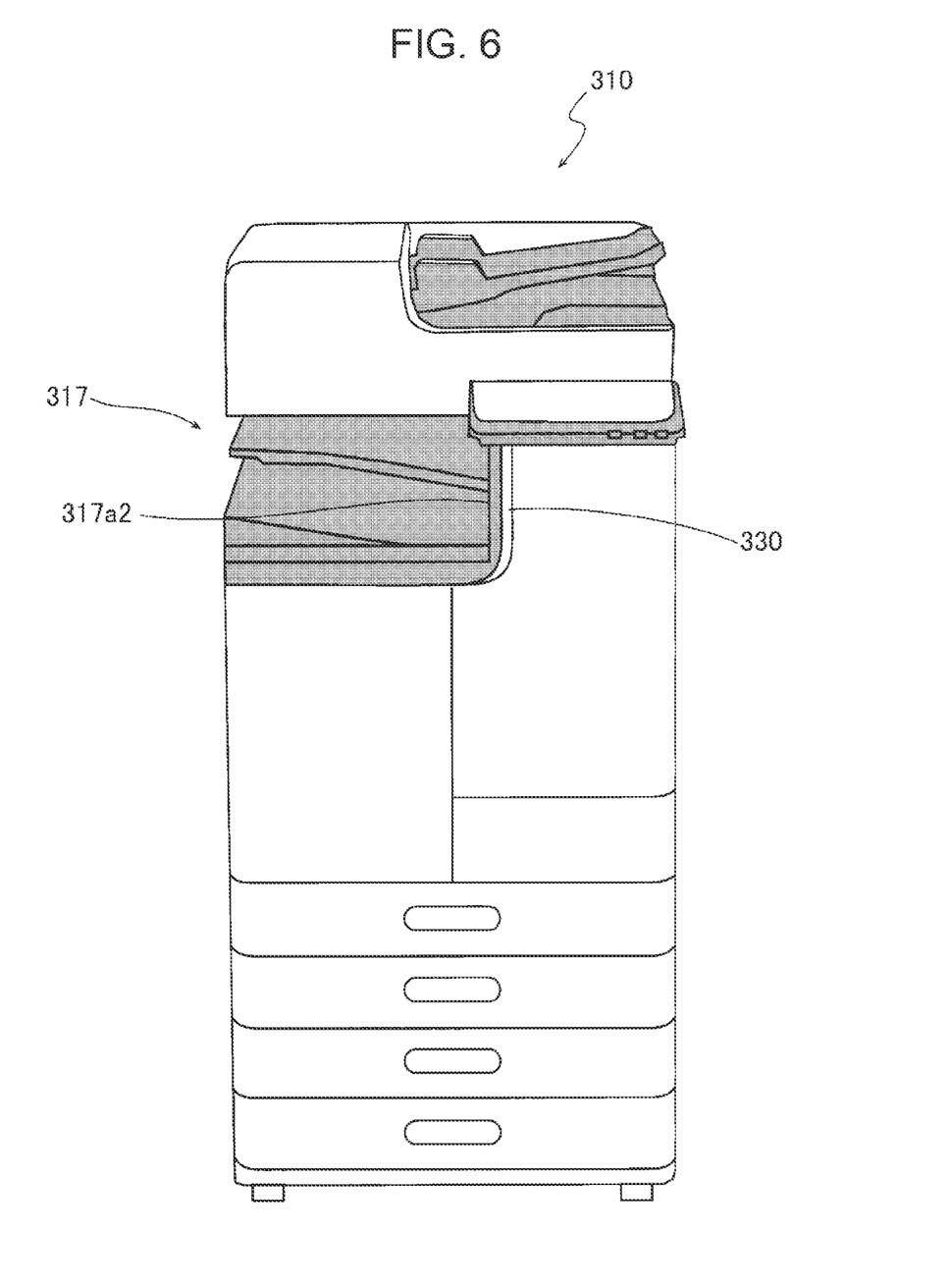
FIG. 6 is an external perspective view illustrating an image forming apparatus according to a modification.
Figure 7A:
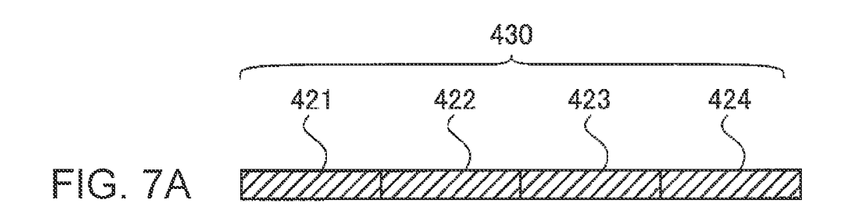
FIGS. 7A to 7E are schematic views each illustrating a light emission state of a light emitting section according to a modification.
Figure 7B:
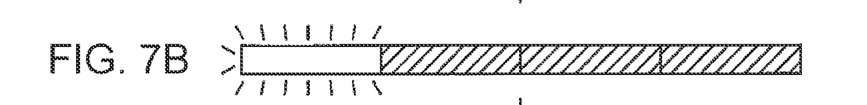
Figure 7C:
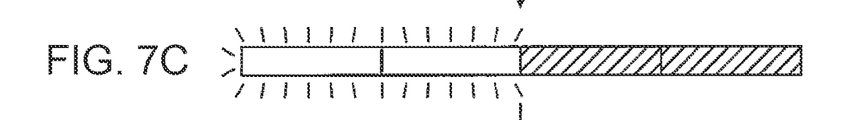
Figure 7D:
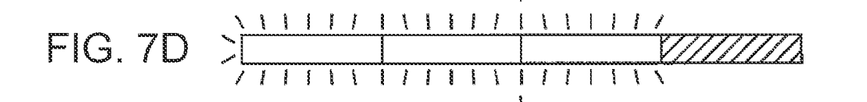
Figure 7E:
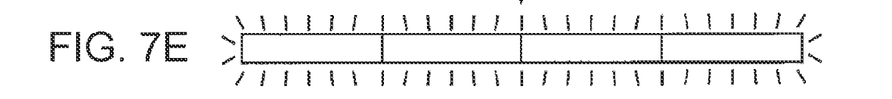

FIG. 6 is an external perspective view illustrating an image forming apparatus according to a modification. The image forming apparatus 210 illustrated in FIG. 4 includes the light emitting section 230 disposed at the border with the front end of the bottom wall surface 217a3 of the internal discharge space 217, whereas an image forming apparatus 310 illustrated in FIG. 6 includes a light emitting section 330 that is disposed at a border with a front end of a right wall surface 317a2 of an internal discharge space 317.

In the image forming apparatus 210, the light emitting section 230 illuminates from the rear of the front wall member 211a1a to the front of the rear wall member 211a1c, providing indirect lightning. Accordingly, the image forming apparatus 210 can provide light that is bright yet gentle on the eyes. It should be noted that the image forming apparatus 310 can also achieve similar effects. In the above-described embodiments, the light emitting sections only illuminate or blink, but the present disclosure is not limited to this example.

FIGS. 7A to 7E are schematic views each illustrating a light emission state of a light emitting section according to a modification. A light emitting section 430 illustrated in FIGS. 7A to 7E includes four light emitters 421 to 424 that can be individually selectively switched on or switched off. As illustrated in FIGS. 7A to 7E, all light emitters are switched off in a default state, and starting from light emitter 421 on the left, the light emitters 422 to 424 can be sequentially switched on to the right. The changes of the light emission states are controlled by a controller (not illustrated). With the light emitters individually switched on sequentially, a paper discharge state can be indicated and operations of the image forming apparatus can be checked from a distance.

Figure 8:
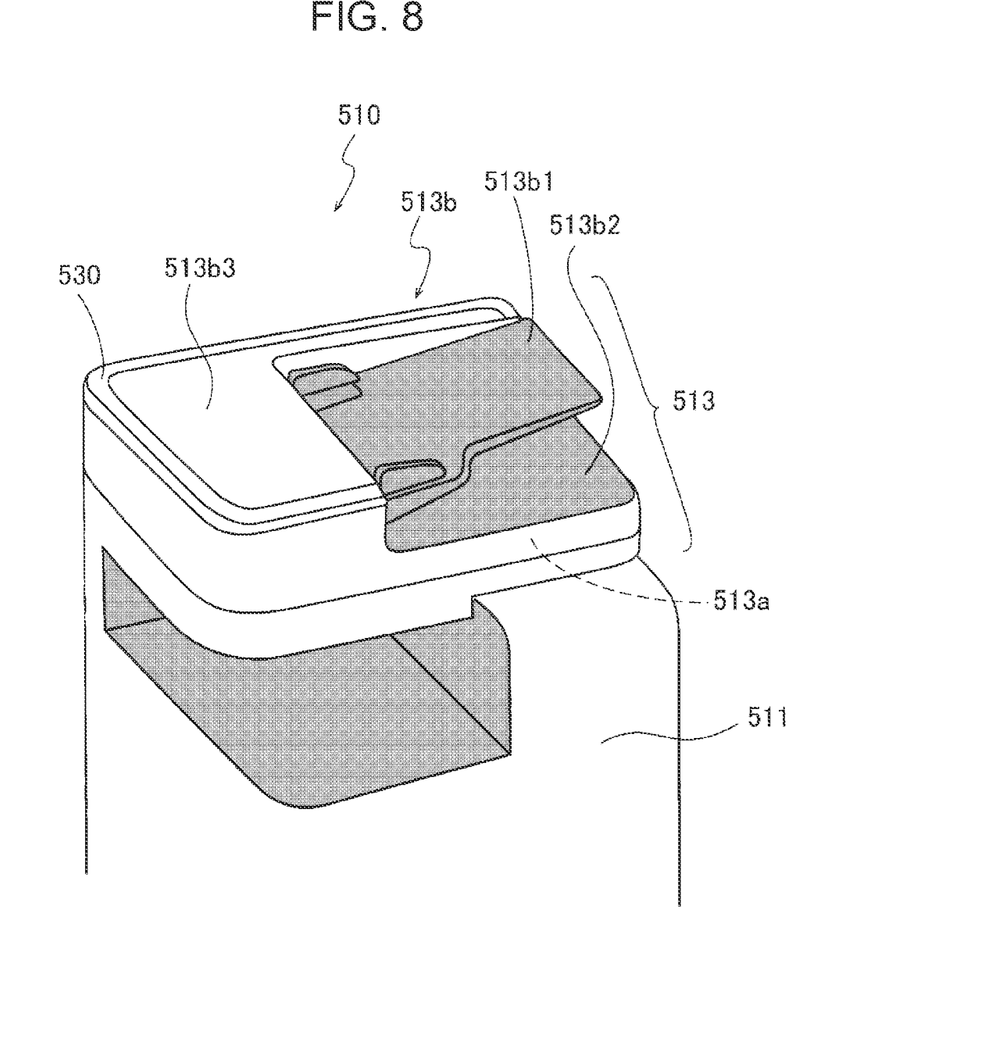
FIG. 8 is an external perspective view illustrating an image forming apparatus according to a modification.
Figure 9:
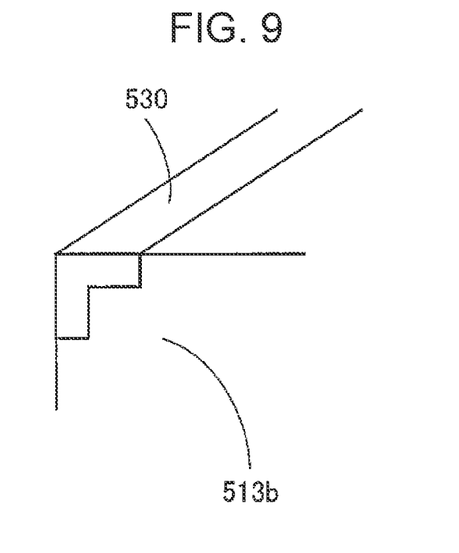
FIG. 9 is a partial sectional view illustrating the image forming apparatus.

FIG. 8 is an external perspective view illustrating an image forming apparatus according to a modification. FIG. 9 is a partial sectional view illustrating the image forming apparatus. In this modification, an ADF 513b is provided as a part of an image reading section 513. The ADF 513b is disposed on a document placing table 513a. The ADF 513b includes a document feeding table 513b1 that is inclined gently upward from a central portion to the right. The ADF 513b includes a mechanism section 513b3 on the left. A document discharge tray 513b2 is disposed below the document feeding table 513b1.

A top end of the ADF 513b is substantially rectangular and, except for the document feeding table 513b1 and the document discharge tray 513b2, is a bright color. The top of the ADF 513b, except for the document feeding table 513b1 and the document discharge tray 513b2, has a substantially L-shape. A light emitting section 530, which emits blue light, is provided around an edge of a peripheral line of the L-shaped portion.

Figure 10:
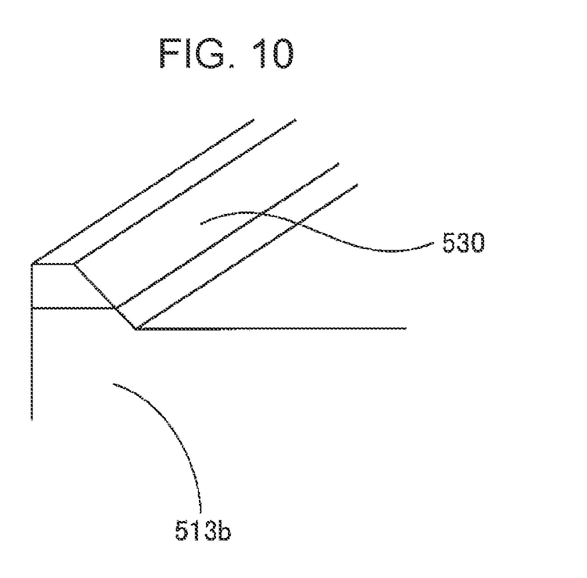
FIG. 10 is a partial sectional view illustrating the image forming apparatus according to a modification.

The cross-section of the light emitting section 530 illustrated in FIG. 9 has an L-shape, whereas the cross-section of the light emitting section 530 illustrated in FIG. 10 has a trapezoidal shape. The L-shape enables the light emitting section 530 to emit light from at least two sides. The trapezoidal shape enables the light emitting section 530 to emit light from three sides except for the bottom. Both light emitting sections 530 emit blue light upward and in the peripheral edge direction. As described above, the image reading section 513 including the ADF 513b is disposed on the top of a housing 511 and the light emitting section 530 having a predetermined length is provided at the top edge portion of the ADF 513b of the image reading section 513. The top of the ADF 513b is the highest position in an image forming apparatus 510, and thus the light emitting section 530 can be viewed without obstruction in an office, and the state of the image forming apparatus 510 can be readily checked from a distance by viewing the light emission state.

The light emitting section 530 may be located between the internal discharge space 317 and the document placing table 513a.

It should be noted that the present disclosure is not limited to the above-described embodiments. Although it will be apparent to a person skilled in the art, the following are disclosed as embodiments of the present disclosure:

Any combination of the interchangeable components, structures, or the like disclosed in the above-described embodiments may be applied appropriately; Although not disclosed in the above-described embodiments, any component, structure, or the like disclosed in the above-described embodiments may be replaced with a replaceable component, structure, or the like known in the art, and any combination of the components, structures, or the like may be changed and applied appropriately; and Although not disclosed in the above-described embodiments, any component, structure, or the like disclosed in the above-described embodiments may be replaced with a component, structure, or the like known in the art or the like assumed to be substituted for the components, structures, or the like disclosed in the above-described embodiments by a person skilled in the art, and any combination of the components, structures, or the like may be changed and applied appropriately.

What is claimed is:

1. An image forming apparatus comprising:
a housing;
an image reader configured to read a document mounted on a document placing table;
an image former configured to form an image read by the image reader or form another image on a sheet;
a discharger configured to discharge the sheet on which the image is formed by the image former;
a discharge tray configured to receive the sheet discharged from discharger; and
a light emitter configured to emit light outwardly from the image forming apparatus, wherein
an internal discharge space is defined between the image reader and the image former,
the internal discharge space has an opening in a front of the image forming apparatus, and
the light emitter is positioned near a border between the internal discharge space and an adjacent outer vertical wall on a lower part of the housing, and has a predetermined length along the border.

2. The image forming apparatus according to claim 1, wherein the internal discharge space has a border extending straight in a vertical direction or in a horizontal direction with respect to the housing, and the light emitter has the predetermined length and extends straight along the border in the vertical direction or in the horizontal direction.

3. The image forming apparatus according to claim 1, wherein the housing has a dark-color portion continuous with the internal discharge space and a bright-color portion continuous with the dark-color portion, and the light emitter is provided at a border between the dark-color portion and the bright-color portion.

4. The image forming apparatus according to claim 1, wherein the housing has a step portion that is recessed along the border, and the light emitter emits light from inside the step portion.

5. The image forming apparatus according to claim 1, further comprising:
   an operator formed in a plate shape and protruding forward from a front portion of the image reader, wherein
   the light emitter includes a sub-light emitter configured to emit light in a lower portion of the operator.

6. The image forming apparatus according to claim 1, wherein the light emitter emits white light, and the housing includes a blue plate along the light emitter to diffuse blue light.

7. The image forming apparatus according to claim 1, wherein the light emitter includes a plurality of light emitters, and the plurality of light emitters is turned on and off depending on a state of the image forming apparatus.

8. The image forming apparatus according to claim 1, further comprising:
   a controller configured to determine a state of the image forming apparatus, wherein
   a light emission state of the light emitter is changed depending on the state determined by the controller.

* * * * *